(12) United States Patent
Kim

(10) Patent No.: US 9,383,211 B2
(45) Date of Patent: Jul. 5, 2016

(54) NAVIGATION SYSTEM AND METHOD FOR DISPLAYING MAP ON NAVIGATION SYSTEM

(71) Applicant: HYUNDAI MNSOFT, Inc., Seoul (KR)

(72) Inventor: Sang Hun Kim, Seoul (KR)

(73) Assignee: HYUNDAI MNSOFT, INC., Seoul (KR)

( * ) Notice: Subject to any disclaimer, the term of this patent is extended or adjusted under 35 U.S.C. 154(b) by 191 days.

(21) Appl. No.: 14/066,763

(22) Filed: Oct. 30, 2013

(65) Prior Publication Data

US 2014/0300621 A1 Oct. 9, 2014

(30) Foreign Application Priority Data

Apr. 8, 2013 (KR) .......................... 10-2013-0038342

(51) Int. Cl.
G09G 5/02 (2006.01)
G01C 21/26 (2006.01)
G06T 11/00 (2006.01)
G01C 21/32 (2006.01)

(52) U.S. Cl.
CPC ............... *G01C 21/26* (2013.01); *G01C 21/32* (2013.01); *G06T 11/001* (2013.01)

(58) Field of Classification Search
None
See application file for complete search history.

(56) References Cited

U.S. PATENT DOCUMENTS

| 6,725,154 | B2 | 4/2004 | Kamikawa et al. | |
|---|---|---|---|---|
| 2004/0128070 | A1 | 7/2004 | Schmidt et al. | |
| 2007/0014488 | A1* | 1/2007 | Chen et al. | 382/294 |
| 2008/0198175 | A1* | 8/2008 | Sun et al. | 345/629 |
| 2008/0228393 | A1 | 9/2008 | Geelen et al. | |
| 2011/0187900 | A1 | 8/2011 | Park et al. | |
| 2012/0162252 | A1* | 6/2012 | Endo | 345/629 |
| 2013/0047106 | A1 | 2/2013 | Sasayama et al. | |

FOREIGN PATENT DOCUMENTS

| JP | 2006126402 A | 5/2006 |
|---|---|---|
| KR | 10-2002-0070237 | 9/2002 |
| KR | 2003-0095237 A | 12/2003 |
| KR | 20110089665 A | 8/2011 |

OTHER PUBLICATIONS

Extended European Search Report dated Aug. 19, 2014 issued in corresponding European application No. 13190228.0.
Office Action dated Apr. 1, 2014 issued in corresponding Korean application No. 2013-0038342.

* cited by examiner

*Primary Examiner* — William Beutel
(74) *Attorney, Agent, or Firm* — Bacon & Thomas, PLLC

(57) ABSTRACT

A method for displaying a map performed by a navigation system, the method comprising: defining a matching area of a numerical map to which a photomap is matched; extracting the photomap corresponding to the matching area from a map data storage; matching a reference point of the photomap and a reference point of the numerical map; matching a scale of the photomap in line with a scale of the numerical map; and performing a boundary treatment at an overlap area of the numerical map and the photomap that are matched.

14 Claims, 7 Drawing Sheets

NAVIGATION SYSTEM AND METHOD FOR DISPLAYING MAP ON NAVIGATION SYSTEM

RELATED APPLICATIONS

This application claims the benefit of Korean Patent Application No. 10-2013-0038342, filed on Apr. 8, 2013, which is hereby incorporated by reference as if fully set forth herein.

FIELD OF THE INVENTION

The present invention relates to a navigation system and a method for displaying a map on the navigation system. More specifically, the present invention relates to a navigation system and a method for displaying a map on the navigation system, capable of displaying the map that is produced by composing a numerical map and a photomap when displaying the map on the navigation system.

BACKGROUND OF THE INVENTION

Currently, as the number of moving bodies such as a vehicle continues to increase, the traffic congestion becomes worse and worse. Further, since the increasing speed of the number of the moving bodies is becoming faster than that of the infrastructure such as road, there occur severe problems such as a traffic congestion.

In such a situation, navigation systems are highlighted as one of the solutions to the traffic congestion. A navigation system receives a navigation message transmitted from satellites for GPS (Global Positioning System) to determine a current position of a moving body, matches the current position of the moving body to map data to display it on a screen of the navigation system, and searches for a driving route from the current position of the moving body to a destination. Further, the navigation system guides a user to drive a moving body along the searched driving route, whereby the user can make use of a road network given efficiently.

Typically, the map displayed on a screen in a navigation system is a numerical map, which displays roads and geographic features using digitized map data on the basis of 2D images, or models the geographic features in 3D images to display them so that a user feels more real.

Recently, images of driving route through the use of photomaps such as aerial photographs taken from aircrafts or satellite photographs taken from satellites are provided, so that it may be possible to precisely capture a real road state and surrounding situation.

However, in case of providing the photomaps only, it may not be possible to keep them latest due to the difference between the time point when an aerial photograph or a satellite photograph is taken and the time point when it is updated. Therefore, there occurs a problem in that an image of a newly opened road or closed road is not timely reflected and provided.

Related art of the disclosure of the present invention is disclosed in Korean Laid-Open Patent No. 10-2002-0047531, entitled "Method and apparatus for searching information of point of interest," published on Sep. 5, 2002, which is incorporated by reference herein in its entirety.

SUMMARY OF THE INVENTION

In view of the above, the present invention provides a navigation system and a method for displaying a map on the navigation system, capable of displaying the map of the latest update that is produced by composing a numerical map and a photomap when displaying the map on the navigation system and improving a quality of the map by displaying a real space.

Further, the present invention provides a navigation system and a method for displaying a map on the navigation system, capable of smoothly overlapping a numerical map with a photomap with a controlled transparency at a boundary of them when displaying the map on the navigation system, thereby minimizing a sense of the difference between data.

In accordance with an embodiment of the present invention, there is provided a method for displaying a map performed by a navigation system, which includes: defining a matching area of a numerical map to which a photomap is matched; extracting the photomap corresponding to the matching area from a map data storage; matching a reference point of the photomap and a reference point of the numerical map; matching a scale of the photomap in line with a scale of the numerical map; and performing a boundary treatment at an overlap area of the numerical map and the photomap that are matched.

In the exemplary embodiment, wherein the defining a matching area comprises: setting the matching area in a rectangular block unit.

In the exemplary embodiment, wherein the defining a matching area comprises; setting the matching area in a polygon unit.

In the exemplary embodiment, wherein the extracting the photomap comprises; extracting the photomap larger than the matching area.

In the exemplary embodiment, wherein the performing a boundary treatment comprises; performing an Alpha Blending process with respect to the overlap area.

In the exemplary embodiment, wherein the photomap includes an aerial photomap or a satellite photomap.

In accordance with an embodiment of the present invention, there is provided a navigation system, comprising: a display unit; a map data storage configured to store a numerical map and a photomap; and a control unit configured to define a matching area of the numerical map to which the photomap is matched, to extract the photomap corresponding to the matching area from the map data storage, to match reference points and scales of the numerical map and the extracted photomap, and to perform a boundary treatment with respect to an overlap area of the numerical map and the extracted photomap that are matched to be displayed through the display unit.

In the exemplary embodiment, wherein the control unit sets the matching area in a block unit.

In the exemplary embodiment, wherein the control unit sets the matching area in a polygon unit.

In the exemplary embodiment, wherein the control unit extracts the photomap larger than the matching area.

In the exemplary embodiment, wherein the control unit performs an Alpha Blending process with respect to the overlap area.

In the exemplary embodiment, wherein the photomap includes an aerial photomap or a satellite photomap.

In accordance with an embodiment of the present invention, there is provided a method for displaying a map on a navigation system, which includes: defining a matching area of a photomap to which a numerical map is matched; extracting a part of the numerical map corresponding to the matching area from a map data storage; matching a reference point of the numerical map and a reference point of the photomap; matching a scale of the numerical map in line with a scale of the photomap; and performing a boundary treatment at an overlap area of the photomap and the numerical map that are matched.

As described above, in a navigation system and a method for displaying a map on the navigation system in accordance with the embodiments of the present invention, it is possible to display a newly updated map produced by composing a numerical map and a photomap together and thus to enhance a quality of the map by displaying a real space when displaying the map.

Further, in a navigation system and a method for displaying a map on the navigation system in accordance with the embodiments of the present invention, it is possible to minimize a sense of the difference between data by smoothly overlapping a numerical map with a photomap with a controlled transparency at a boundary of them when displaying the map on a navigation system, thereby embodying a natural guide image.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
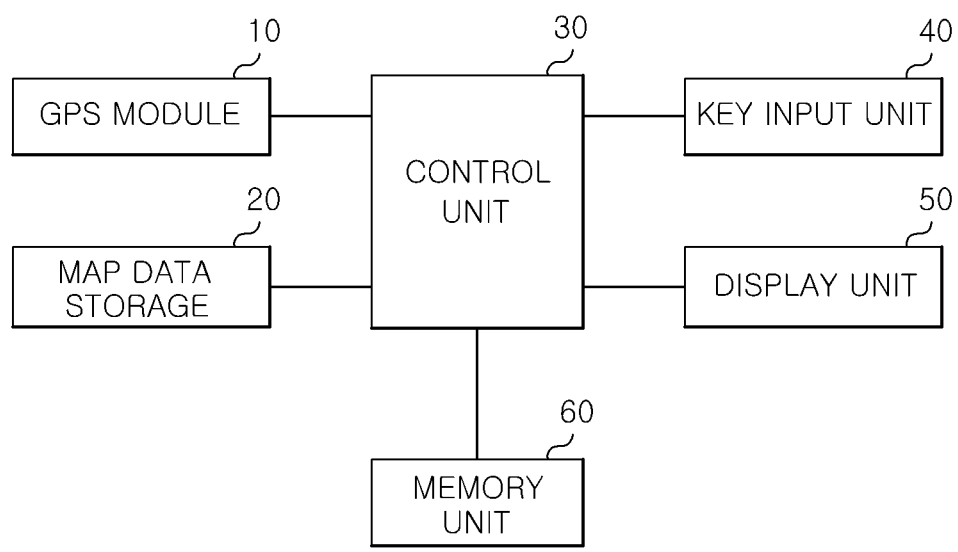
FIG. 1 is a block diagram of a navigation system in accordance with an embodiment of the present invention.

Hereinafter, an embodiment of a method for displaying a map on a navigation system in accordance with the present invention will be described with reference to the accompanying drawings. In referring to the drawings, thickness of lines and size of components shown in the drawings may be exaggerated for the purpose of descriptive clarity and for the sake of convenience. Further, the following terms are defined in consideration of the functions of the present invention, which may vary depending on the intentions of a user or an operator or practices. Therefore, the definition of such terms should be made on the basis of the disclosure throughout the present specification.

FIG. 1 is a block diagram of a navigation system in accordance with an embodiment of the present invention.

As illustrated in FIG. 1, the navigation system includes a GPS module 10, a map data storage 20, a memory unit 60, a key input unit 40, a control unit 30, and a display unit 50.

The GPS module 10 receives navigation messages from a plurality of GPS satellites (not shown) positioned over the earth and provides them to the control unit 30 so that its current position can be acquired.

The map data storage 20 stores map data of both a numerical map and a photomap used to guide a driving route of a moving body (not shown) obtained after searching the driving route.

Figure 2:
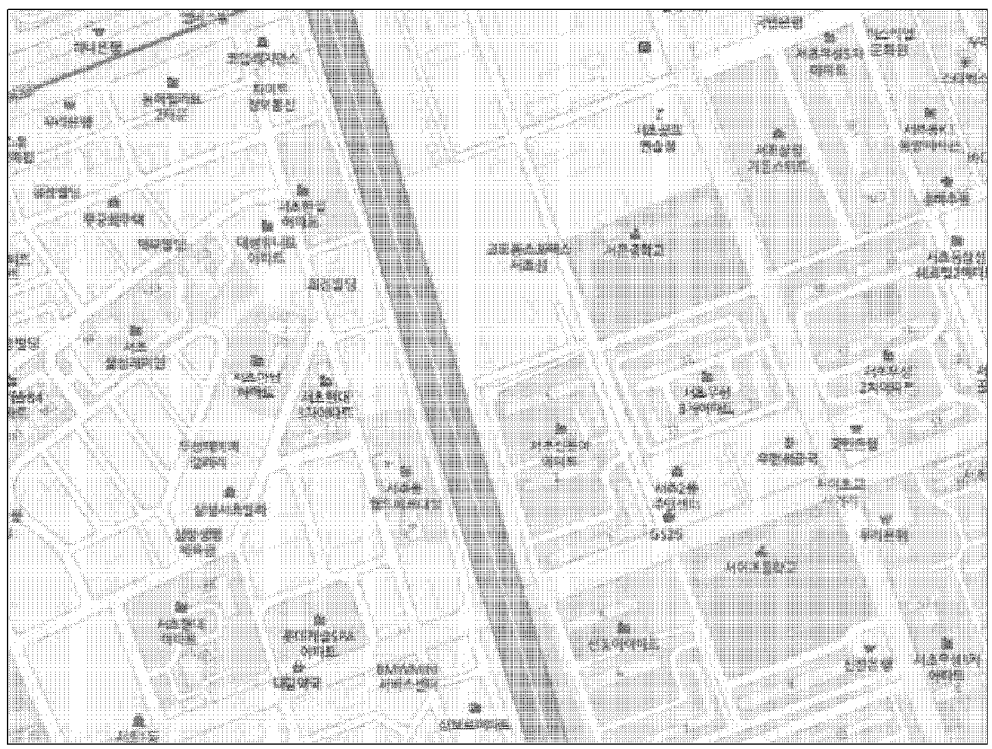
FIG. 2 illustrates an exemplary numerical map displayed on a navigation system in accordance with an embodiment of the present invention.

As illustrated in FIG. 2, the numerical map refers to a map that displays roads and geographic features based on a 2D image through digitized map data or that realistically displays geographic features by modeling roads and geographical features in a 3D image.

Figure 3:
FIG. 3 illustrates an exemplary photomap displayed on a navigation system in accordance with an embodiment of the present invention.

Further, as illustrated in FIG. 3, the photomap refers to a map that provides an image of a driving route along a coordinate through an aerial photograph really taken from an aircraft to easily recognize real road states and surrounding situations. The photomap may include a satellite photomap displayed on the basis of satellite photographs taken from satellites.

The memory unit 60 stores various kinds of data including setting values to operate the navigation system and searched driving routes.

The key input unit 40 includes a plurality of function keys or buttons to receive from a user each setting value to operate the navigation system and a destination chosen to set a driving route.

The control unit 30 detects a current position of the moving body, e.g., a vehicle or a car, using the navigation messages received through the GPS module 10, and reads out map data stored in the map data storage 20 to display the current position of the moving body on the map.

The control unit 30 also extracts the photomap along with the numerical map from the map data storage 20 using longitudinal and latitudinal coordinates and then combines the numerical map and the photomap in conformity with a reference point and scale of the numerical map, when displaying the map data.

More specifically, the control unit 30 defines or selects a candidate area from the numerical map, extracts or cuts out a matching area of the photomap, which corresponds to the candidate area, and then combines the numerical map and the matching area of the photomap so that the candidate area of the numerical map is substituted with the matching area of the photomap. As a result, the navigation system displays a combined image in which the matching area of the photomap is fused into the numerical map on behalf of the candidate area. The term used herein such as "candidate area" means an area defined or selected from the numerical map by a user who desires to see an actual image with respect to the candidate area, and the term "matching area" means a section which corresponds to an area having the actual image in the photomap.

During such a matching process as mentioned above, the control unit 30 may define or select the candidate area and the matching area in a unit of block or polygon. Further, the control unit 30 may perform a boundary treatment, for example, such as an Alpha Blending process to control a transparency in a boundary between the photomap and the numerical map that are combined so that the boundary can be smoothly viewed, thereby minimizing a sense of difference between the numerical map and the photomap.

Although the embodiment of the present invention has been described and shown that the candidate area and the matching area are respectively defined or selected from the numerical map and the photomap, it may be possible to respectively defined or selected from the photomap and the numerical map in reverse.

Further, the control unit 30 searches a driving route from a current position to a destination on the basis of map data, which is stored in the map data storage 20, in accordance with the commands inputted through the key input unit 40 and guides a user along the searched driving route.

The display unit 50 displays various operation states of the components under the control of the control unit 30 and the driving route searched by the control unit 30, and the numerical map and photomap matched by the control unit 30.

Figure 4:
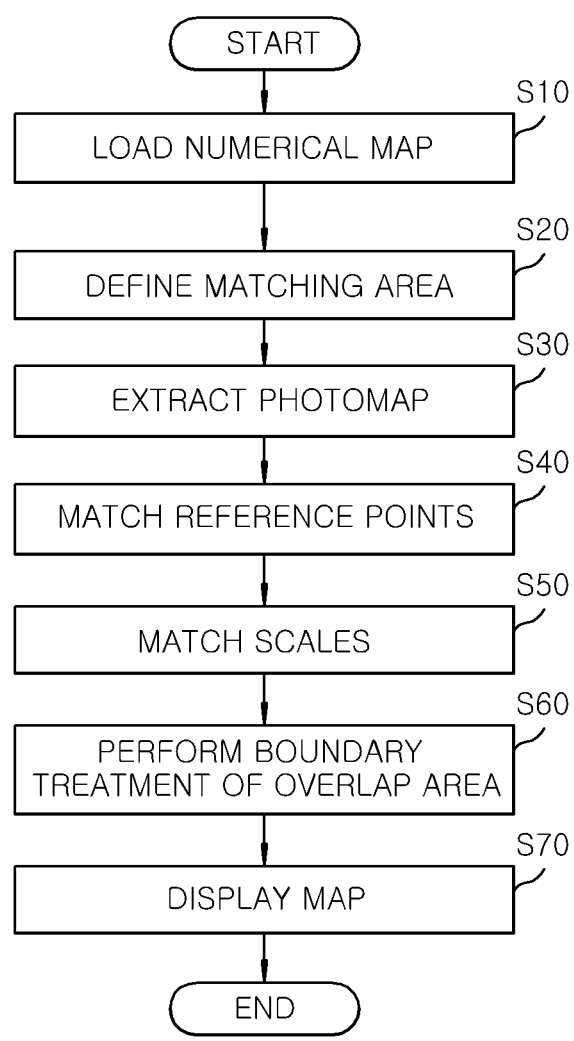
FIG. 4 is a flowchart illustrating a method for displaying a map on a navigation system in accordance with an embodiment of the present invention.
Figure 5A:
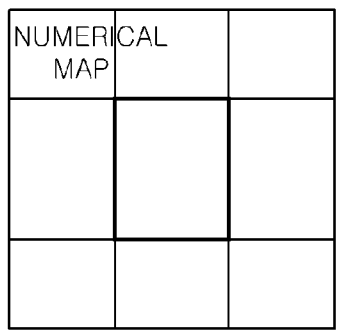
FIGS. 5A to 5C are exemplary diagrams illustrating a procedure in which a numerical map and a photomap are matched in a rectangular block unit based on a method for displaying a map on a navigation system in accordance with an embodiment of the present invention.
Figure 5B:
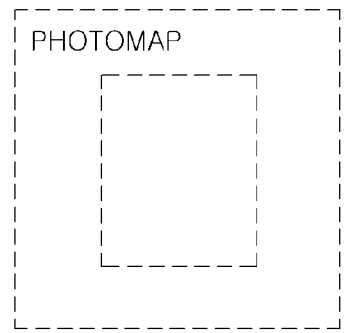
Figure 5C:
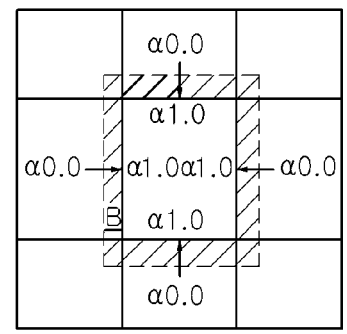
Figure 6:
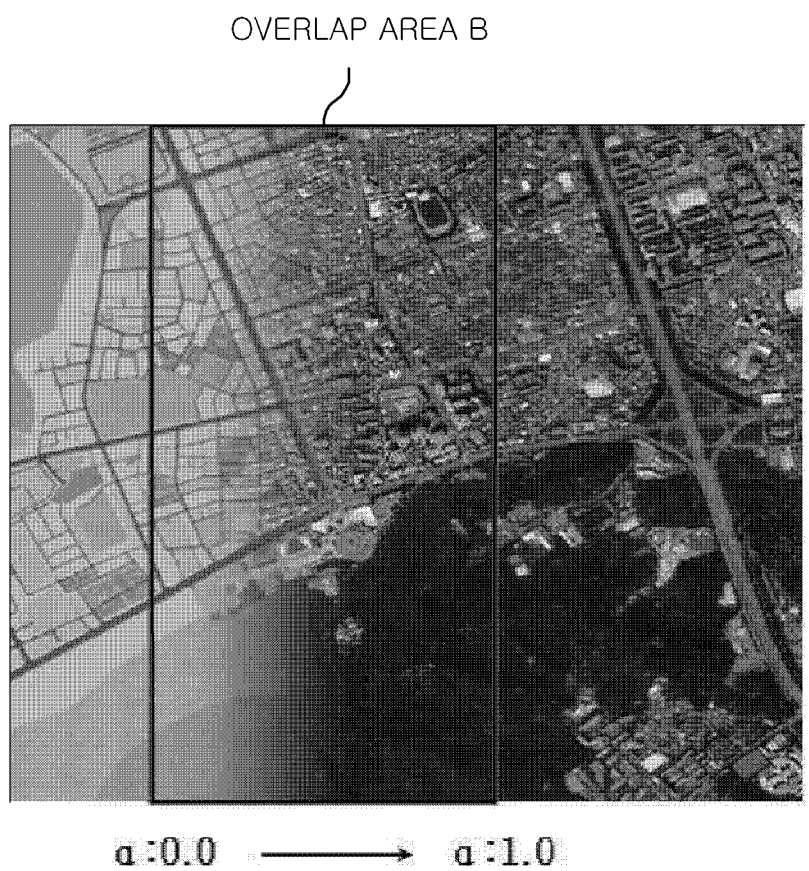
FIG. 6 is an exemplary view illustrating an Alpha Blending process performed on an overlap area based on a method for displaying a map on a navigation system in accordance with an embodiment of the present invention.
Figure 7A:
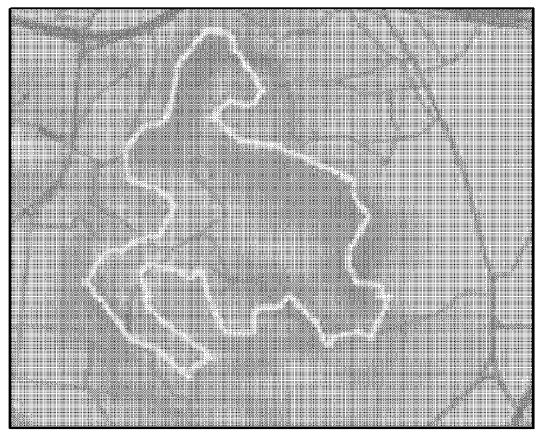
FIGS. 7A to 7C are exemplary views illustrating a procedure in which a photomap is matched to a numerical map in a polygon unit based on a method for displaying a map on a navigation system in accordance with an embodiment of the present invention.
Figure 7B:
Figure 7C:
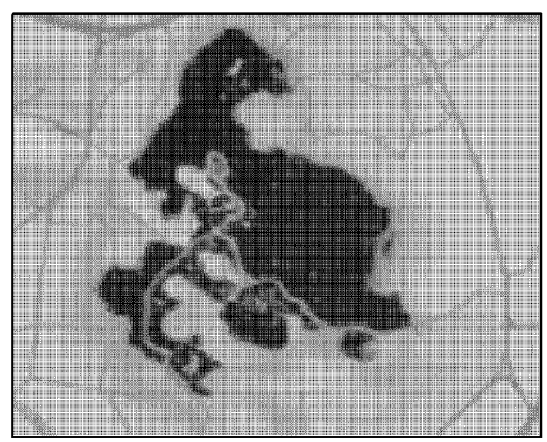

FIG. 4 is a flowchart illustrating a method for displaying a map on a navigation system in accordance with an embodiment of the present invention; FIGS. 5A to 5C are exemplary diagrams illustrating a procedure in which a numerical map and a photomap are matched in a rectangular block unit based on a method for displaying a map on a navigation system in accordance with an embodiment of the present invention; FIG. 6 is an exemplary view illustrating an Alpha Blending process performed on an overlap area based on a method for displaying a map on a navigation system in accordance with an embodiment of the present invention; and FIGS. 7A to 7C are exemplary views illustrating a procedure in which a photomap is matched to a numerical map in a polygon unit based on a method for displaying a map on a navigation system in accordance with an embodiment of the present invention.

As illustrated in FIG. 4, in a method for displaying a map on a navigation system in accordance with an embodiment of the present invention, the control unit 30 loads from the map data storage 20 a numerical map, which includes a current position detected through the GPS module 10 or a position selected through the key input unit 40 in block S10.

Subsequently, in block S20, the control unit 30 defines a matching area in the numerical map to which a partial area of the photomap will be matched or overwitten. In this process, the matching area may be set in a rectangular block unit as illustrated in FIGS. 5A to 5C, or in a polygon unit as illustrated in FIGS. 7A to 7C.

Further, in case of defining the matching area in a block unit, the matching area or condition of the numerical map to which the photomap will be matched may be set by a user. Also, in case of defining the matching area in a polygon unit, the matching area of the numerical map to which the photomap will be matched may be set, or a specific condition for directly choosing a given matching zone, for example, such as a park, a golf course, a contour line, a green belt, a water system, or the like.

In these cases, the photomap may include an aerial photomap or a satellite photomap of which coordinates are established based on aerial photographs taken from an aircraft, or satellite photographs taken from satellites.

After the matching area has been defined, in block S30, the control unit 30 extracts a corresponding area of the photomap, which will be matched to the matching area, from the map data storage 20.

The control unit 30 may extract the corresponding area of the photomap larger than the matching area through the use of longitudinal and latitudinal coordinates with respect to the matching area when extracting the corresponding area of the photomap, so that the corresponding area of the photomap may be fully overlapped the matching area of the numerical map.

Next, in block S40, the control unit 30 matches reference points between the areas of the photomap and the numerical map that are extracted using the longitudinal and latitudinal coordinates of both maps. Here, the term "reference points" means base points used to match corresponding points between the photomap and the numerical map, which may be set in various positions and schemes depending on each system specification.

After matching the reference points of the numerical map and the photomap each other as described above, the control unit 30 adjusts a scale of the photomap in line with a scale of the numerical map to match both the maps in block S50.

That is, when the numerical map is displayed in a large scale in the navigation system, the photomap is also controlled in a large scale correspondingly to that of the numerical map. In contrast, when the numerical map is displayed in a small scale in the navigation system, the photomap is also controlled in a small scale correspondingly to that of the numerical map. Therefore, both maps can be matched to be displayed at the same size.

Subsequently, the control unit 30 controls a transparency in an overlap area of the numerical map and the photomap by performing an Alpha Blending process, so that the boundary of the overlap area can be displayed smoothly in block S60. Here, the Alpha Blending refers to a process in which when an overlap area of a numerical map and a photomap matched thereto comes in sight, the boundary of the overlap area may be smoothly displayed without a sense of difference so that an image is naturally seen.

For example, referring to FIGS. 5A to 5C, when matching a photomap to a numerical map in a block unit, a matching area 'A' of the numerical map to which a corresponding area of the photomap is intended to be matched is defined as illustrated in FIG. 5A, and the corresponding area of the photomap, which is larger than the matching area 'A', is extracted from the map data storage 20 as illustrated in FIG. 5B.

The control unit 30 then matches reference points and scales of the numerical map and the extracted photomap as illustrated in FIG. 5C, and then smoothly displays an overlap area 'B' by performing the Alpha Blending process as illustrated in FIG. 6.

For example, as illustrated in FIG. 6, when two images are composed by performing the Alpha Blending process on the numerical map and the photomap, the outside of the overlap area 'B' is processed in $\alpha$:0.0 so that the photomap is composed 0%. Further, the composing ratio increases as approaching the center of the overlap area, and the inside of the overlap area 'B' is processed in $\alpha$:1.0 so that the photomap is composed 100%, whereby a boundary of the overlap area 'B' may be smoothly viewed.

As a result, the numerical map is viewed 100% in the outside of the overlap area 'B', an intermediate part of the overlap area 'B' is composed of 50% of the numerical map and 50% of the photomap, and the photomap is viewed 100% in the innermost part of the overlap area 'B'.

In similar, referring to FIGS. 7A to 7C, when matching a photomap to a numerical map in a polygon unit, the control unit 30 forms a polyline, e.g., along a green belt in the numerical map so as to define a matching area to which the photomap will be matched as illustrated in FIG. 7A and then extracts a corresponding area of the photomap larger than the matching area, which is defined in the numerical map, for map matching from the map data storage 20 as illustrated in FIG. 7B.

Further, the control unit 30 matches the reference points on the numerical map and the extracted photomap, controls the scales of them, and then performs the Alpha Blending process with respect to the overlap area, thereby smoothly displaying the overlap area as illustrated in FIG. 7C.

As such, the control unit 30 smoothly displays a map by controlling a transparency with the Alpha Blending process with respect to the overlap area 'B' when composing and displaying the numerical map and the photomap, thereby minimizing a sense of difference between map data of the numerical map and the photomap in block S70.

As described above, in accordance with a navigation system and a method to display a map on the navigation system, it is possible to display the map of the latest update by composing a numerical map and a photomap together and displaying the composed map and to enhance a quality of the map by displaying a real space when displaying the composed map in the navigation system. Further, it is possible to minimize a sense of the difference between data by smoothly overlapping the numerical map with the photomap with a controlled transparency at a boundary of them.

While the present invention has been shown and described with respect to the embodiments illustrated with drawings, the embodiments are exemplary only and not limited thereto. It will be understood by those skilled in the art that it is possible to make various changes and equivalent another embodiment based on the disclosure. Therefore, the scope of the present invention should be defined by the appended claims rather than by the foregoing embodiments.

What is claimed is:

1. A method for displaying a map performed by a processor of a navigation system including a key input device, a display, a map data storage, and a GPS module, the method comprising:
    loading a numerical map from the map data storage, the numerical map including a current position detected through the GPS module or a specific position selected through the key input device;
    defining a first area of the numerical map;
    matching a scale of a photomap stored in the map data storage with a scale of the numerical map;
    extracting a region of the photomap, the region including a second area corresponding to the first area;
    matching a reference point of the region of the photomap and a reference point of the first area of the numerical map to overlap the region of the photomap on the numerical map;
    generating a matched map by performing a boundary treatment at an area of the region of the photomap outside the first area;
    displaying the matched map by the display; and
    wherein the boundary treatment includes an Alpha Blending process in which an alpha value for the Alpha Blending process decreases as a distance from a border of the first area increases.

2. The method of claim 1, wherein the first area is set in a rectangular block unit.

3. The method of claim 1, wherein the first area is set in a polygon unit.

4. The method of claim 1, wherein the region of the photomap is larger than the second area.

5. The method of claim 1, wherein the photomap includes an aerial photomap or a satellite photomap.

6. The method of claim 1, wherein the first area is set in a polygon unit,
    wherein the region of the photomap is larger than the second area,
    wherein the photomap includes an aerial photomap or a satellite photomap, and
    wherein the first area, when the first area is one of a park, a golf course, a contour line, a green belt, and a water system, is set by selecting a point in the first area or inputting a specific condition for the first area.

7. A navigation system, comprising:
    a GPS module configured to detect a current position;
    a key input device configured to receive an input for selecting a specific position;
    a map data storage configured to store a numerical map and a photomap;
    a processor configured to load the numerical map including the current position or the specific position, to define a first area of the numerical map, to match a scale of the photomap with a scale of the numerical map, to extract a region of the photomap including a second area corresponding to the first area, to match a reference point of the region of the photomap and a reference point of the first area of the numerical map to overlap the region of the photomap on the numerical map, and to generate a matched map by performing a boundary treatment with respect to an area of the region of the photomap outside the first area; and
    a display configured to display the matched map; and
    wherein the boundary treatment includes an Alpha Blending process in which an alpha value for the Alpha Blending process decreases as a distance from a border of the first area increases.

8. The navigation system of claim 7, wherein the first area is set in a rectangular block unit.

9. The navigation system of claim 7, wherein the first area is set in a polygon unit.

10. The navigation system of claim 7, wherein the region of the photomap is larger than the second area.

11. The navigation system of claim 7, wherein the photomap includes an aerial photomap or a satellite photomap.

12. The system of claim 7, wherein the first area is set in a polygon unit,
    wherein the region of the photomap is larger than the second area,
    wherein the photomap includes an aerial photomap or a satellite photomap, and
    wherein the first area, when the first area is one of a park, a golf course, a contour line, a green belt, and a water system, is set by selecting a point in the first area or inputting a specific condition for the first area.

13. A method for displaying a map by a processor on a navigation system including a key input device, a display, a map data storage, and a GPS module, the method comprising:
    loading a photomap from the map data storage, the photomap including a current position detected through the GPS module or a specific position selected through the key input device;
    defining a first area of the photomap matching a scale of a numerical map stored in the map data storage with a scale of the photomap;
    extracting a region of the numerical map, the region including a second area corresponding to the first area;
    matching a reference point of the region of the numerical map and a reference point of the first area of the photomap to overlap the region of the numerical map on the photomap;
    generating a matched map by performing a boundary treatment at an area of the region of the numerical map outside the first area; and
    displaying the matched map by the display; and wherein the boundary treatment includes an Alpha Blending process in which an alpha value for the Alpha Blending process decreases as a distance from a border of the first area increases.

14. The method of claim 13, wherein the first area is set in a polygon unit,
wherein the region of the numerical map is larger than the second area,
wherein the photomap includes an aerial photomap or a satellite photomap, and
wherein the first area, when the first area is one of a park, a golf course, a contour line, a green belt, and a water system, is set by selecting a point in the first area or inputting a specific condition for the first area.

\* \* \* \* \*